US012803294B2

(12) United States Patent
Maffei et al.

(10) Patent No.: US 12,803,294 B2
(45) Date of Patent: Nov. 17, 2026

(54) SYSTEM AND METHOD FOR A MECHANICAL-BASED SENSOR POWER SUPPLY SYSTEM

(71) Applicant: DANA ITALIA S.R.L., Arco (IT)

(72) Inventors: Claudio Maffei, Arco (IT); Gianluca Terrasi, Arco (IT); Davide Deimichei, Trento (IT); Andrea Bortoli, Rovereto (IT); Maddalena Buzzola, Trento (IT)

(73) Assignee: DANA ITALIA S.R.L., Arco (IT)

( * ) Notice: Subject to any disclaimer, the term of this patent is extended or adjusted under 35 U.S.C. 154(b) by 209 days.

(21) Appl. No.: 18/677,276

(22) Filed: May 29, 2024

(65) Prior Publication Data

US 2025/0373065 A1 Dec. 4, 2025

(51) Int. Cl.

| | |
|---|---|
| ***H02J 7/14*** | (2006.01) |
| ***F16H 57/02*** | (2012.01) |
| ***F16H 57/021*** | (2012.01) |
| ***F16H 57/04*** | (2010.01) |
| ***H02J 7/00*** | (2026.01) |

(52) U.S. Cl.

CPC .............. *H02J 7/14* (2013.01); *F16H 57/021* (2013.01); *H02J 7/855* (2026.01); *F16H 2057/02026* (2013.01); *F16H 2057/02034* (2013.01); *F16H 57/04* (2013.01)

(58) Field of Classification Search

CPC ..... H02J 7/14; H02J 7/855; H02J 7/34; F16H 57/021; F16H 57/04; F16H 2057/02026; F16H 2057/02034; F16H 2057/012; F16H 2057/02052; F16H 57/01; H02K 7/1846

See application file for complete search history.

(56) References Cited

U.S. PATENT DOCUMENTS

| | | | | |
|---|---|---|---|---|
| 4,522,608 | A * | 6/1985 | Joyner | F16D 3/387 464/134 |
| 6,118,196 | A * | 9/2000 | Cheng-Yon | H02K 21/227 310/67 A |
| 7,256,505 | B2 * | 8/2007 | Arms | H02J 7/32 290/1 R |
| 7,477,038 | B2 | 1/2009 | Taniguchi | |
| 9,151,276 | B2 * | 10/2015 | Dinter | F16H 1/00 |
| 2014/0091023 | A1 * | 4/2014 | Long | F16N 9/00 184/7.4 |

* cited by examiner

*Primary Examiner* — Tulsidas C Patel
*Assistant Examiner* — Mohammed Ahmed Qureshi
(74) *Attorney, Agent, or Firm* — McCoy Russell LLP

(57) ABSTRACT

Methods and systems for a sensor power supply system comprising a dynamo comprising a case that encloses a plurality of magnets, a coil, and rotor, a rotating wheel, and an axle that couples the case and the rotating wheel, and wherein the dynamo is coupled to a first component and a sensor and the rotating wheel touches a second component. In an example, a method includes generating electrical energy via a sensor power supply system comprising at least a sensor, and a dynamo in response to achieving a rotational speed difference between a first component and a second component and supplying the generated electrical energy to the sensor to power the sensor.

20 Claims, 7 Drawing Sheets

SYSTEM AND METHOD FOR A MECHANICAL-BASED SENSOR POWER SUPPLY SYSTEM

TECHNICAL FIELD

The present disclosure relates to charging sensors coupled to a rotating component in a vehicle.

BACKGROUND AND SUMMARY

There is demand for measuring strain, acceleration, or position of components in a vehicle that are rotating during operation of the vehicle. Continuously measuring the aforementioned parameters is challenging since continuous measurement relies on energy being continuously supplied to the respective sensors that measure the parameters. Existing systems rely on batteries to supply energy and power the sensors. However, implementing a battery is a temporary solution that provides energy to the sensor for a number of days.

U.S. Pat. No. 7,477,038 B2 to Taniguchi shows a vehicle-mounted power supply system. The vehicle-mounted power supply system includes a generator driven by an engine of a vehicle that charges a first storage battery, the first storage battery supplying electricity to a second storage battery via a converter.

The inventors have recognized several issues with Taniguchi's vehicle-mounted power supply system as well as other prior power supply systems. For instance, Taniguchi's power supply system may be difficult to integrate in vehicle systems comprising rotating parts and sensors that measure various parameters of the rotating parts. Taniguchi's power system relies on the conversion of mechanical energy that is directly provided by the engine to electrical energy and charging batteries with the electrical energy. Powering sensors for different rotating parts based on the conversion of mechanical energy from the engine may introduce undesired complexity during operation of the vehicle. More specifically, a more complex control system may be demanded to ensure that the sensors or the batteries coupled to the sensors receive the energy demanded for operation of the sensors or charging of the batteries.

The inventors have recognized the aforementioned challenges and developed a sensor power supply system to at least partially overcome the challenges. The sensor power supply system includes a dynamo comprising a case coupled to a first rotating component, a rotating wheel in contact with a non-rotating component or a second rotating component that rotates at a different speed than the first rotating component, and an axle that couples the rotating wheel and the case, and a sensor coupled to the dynamo via a wire. In this way, the dynamo may convert the mechanical energy generated in response to a rotational speed difference between the first rotating component and the non-rotating component or the first rotating component and the second rotating component to electrical energy that may be used to power the sensor. The sensor power supply system may optionally include a battery or an accumulator coupled to the dynamo and to the sensor. Accordingly, the dynamo may convert the mechanical energy generated in response to the rotational speed difference between the first rotating component and the non-rotating or the first rotating component and the second rotating component to electrical energy that may be used to charge the battery or accumulator. In turn, the battery or accumulator may supply power to the sensor, enabling the sensor to measure a parameter of interest.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for supplying power to a sensor based on a rotational speed difference between two components. In one example, the system includes at least a dynamo and a sensor coupled to the dynamo via wires that are disposed on a surface of a first component, the dynamo being in contact with a second component. In another example, the system also includes a battery or accumulator that is coupled to the dynamo instead of the sensor and to the sensor itself. The dynamo generates mechanical energy based on a rotational speed difference between the first component and the second component to either power the sensor or to charge the battery or the accumulator.

Figure 1:
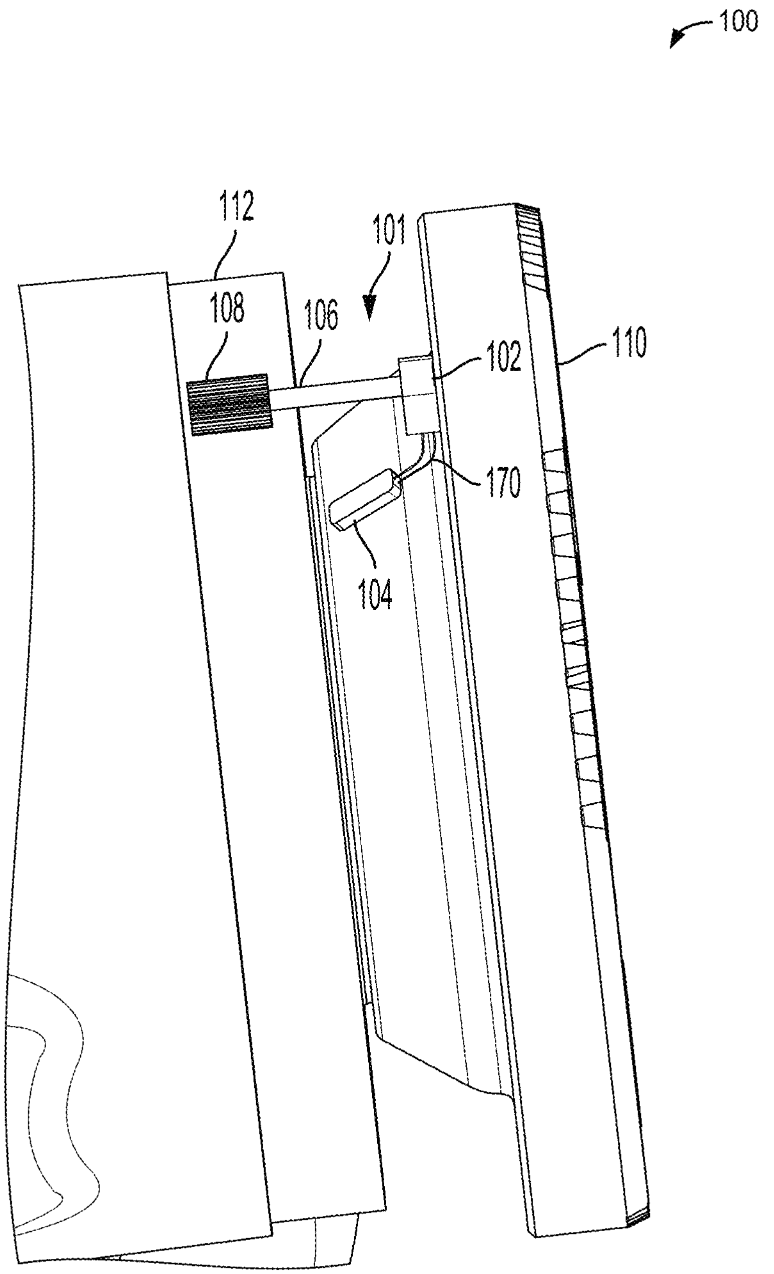
FIG. 1 is schematic depiction of a sensor power supply system.
Figure 2:
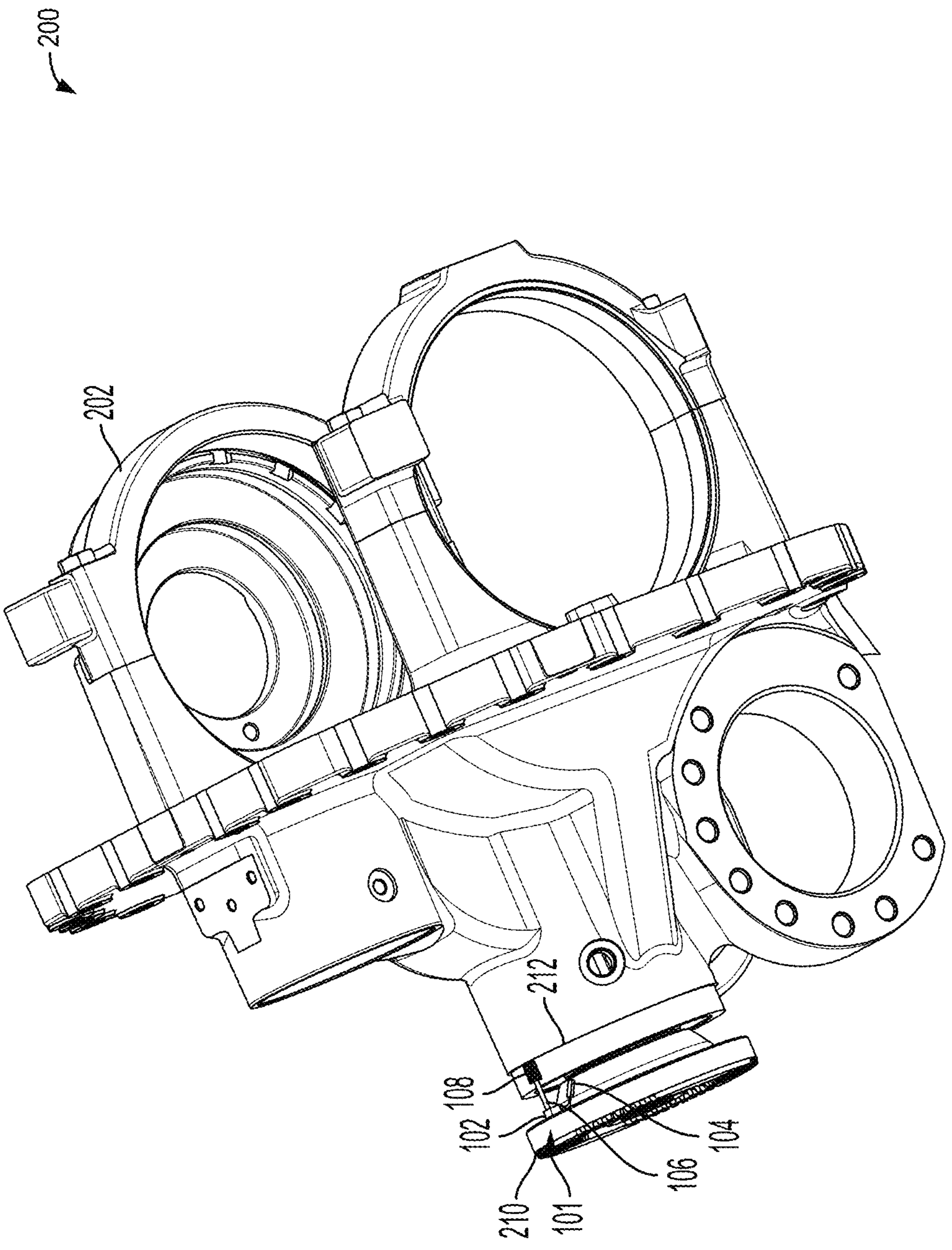
FIG. 2 is a gearbox assembly wherein the sensor power supply system of FIG. 1. is integrated.
Figure 3:
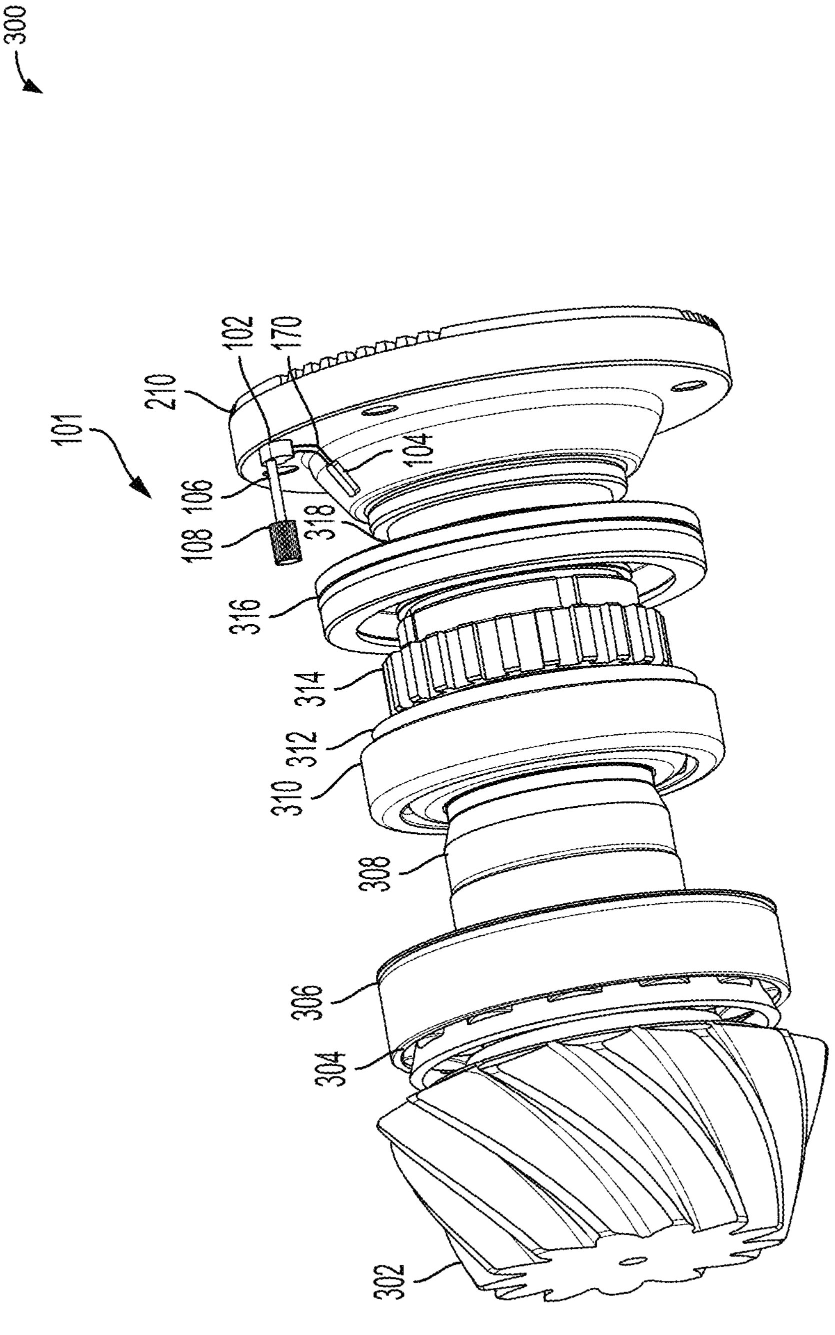
FIG. 3 is an assembled view of a portion of the gearbox assembly, depicted in FIG. 2.
Figure 4:
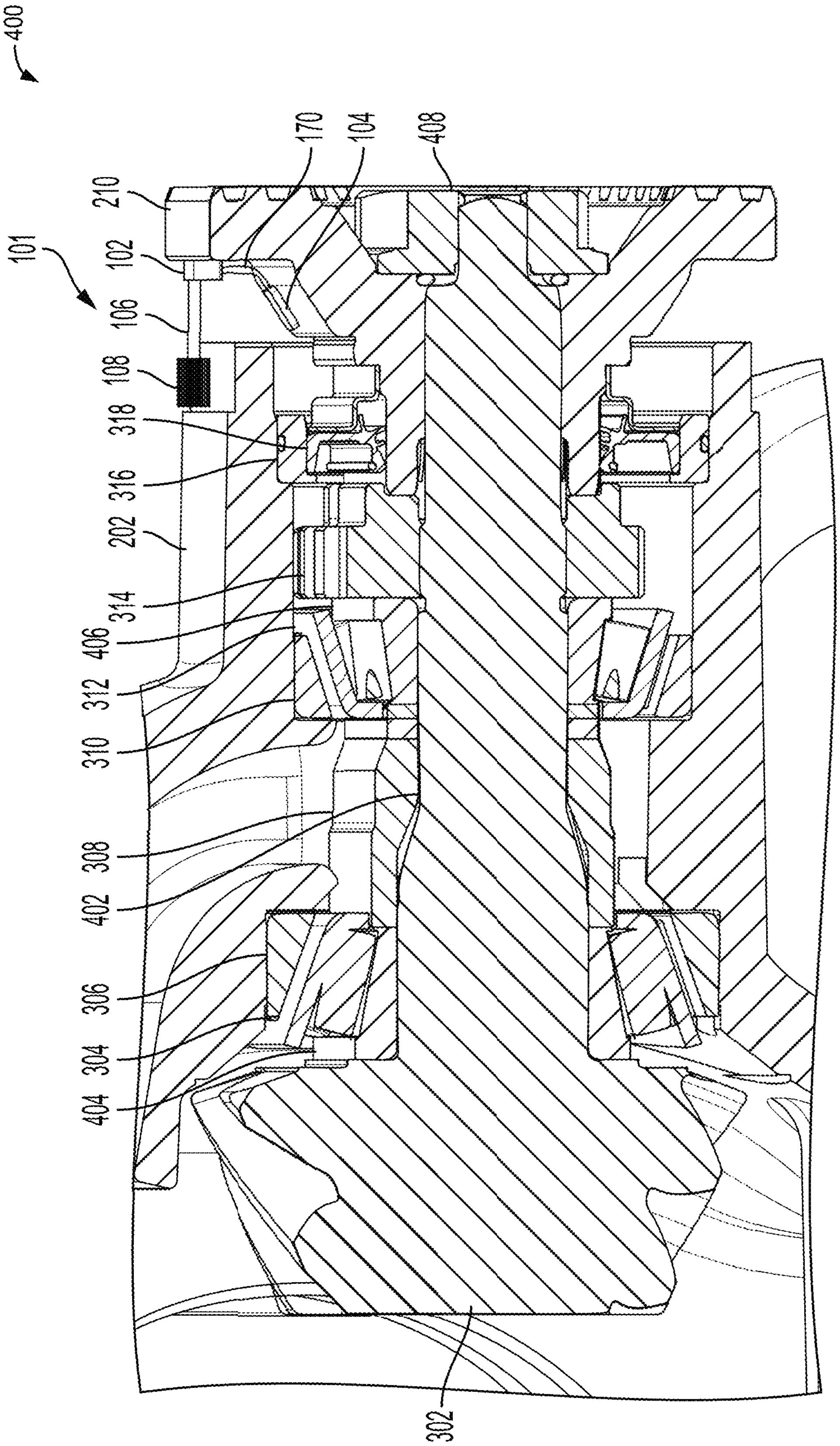
FIG. 4 is a cross-sectional view of the portion of the gearbox assembly depicted in FIG. 3.
Figure 5:
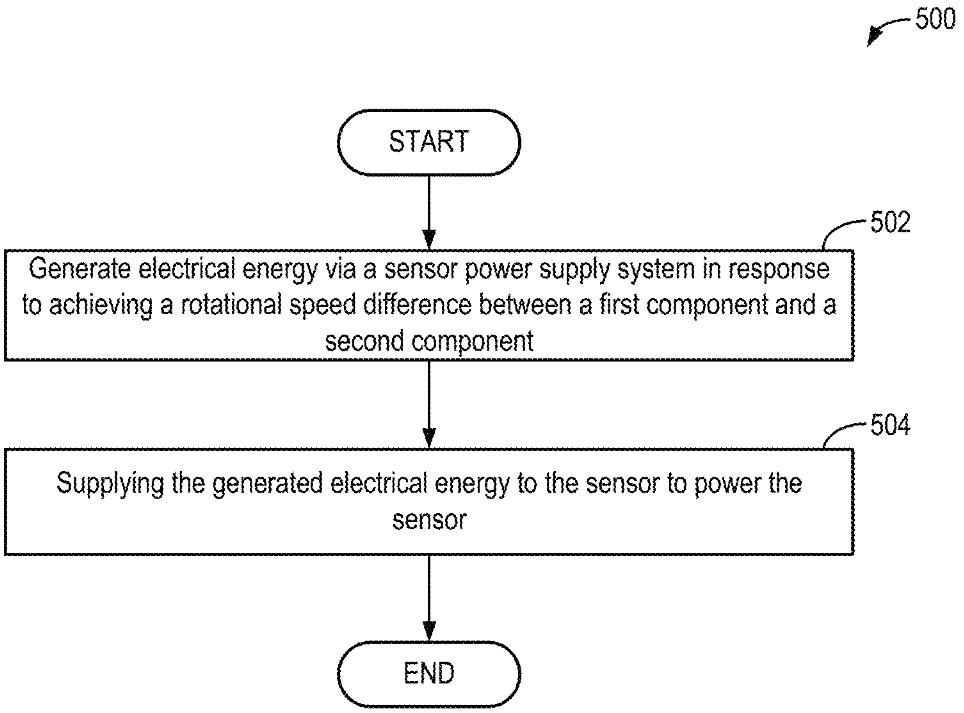
FIG. 5 is an example method for generating electrical energy and supplying energy to the sensor using the sensor power supply system, according to embodiment disclosed herein.
Figure 6:
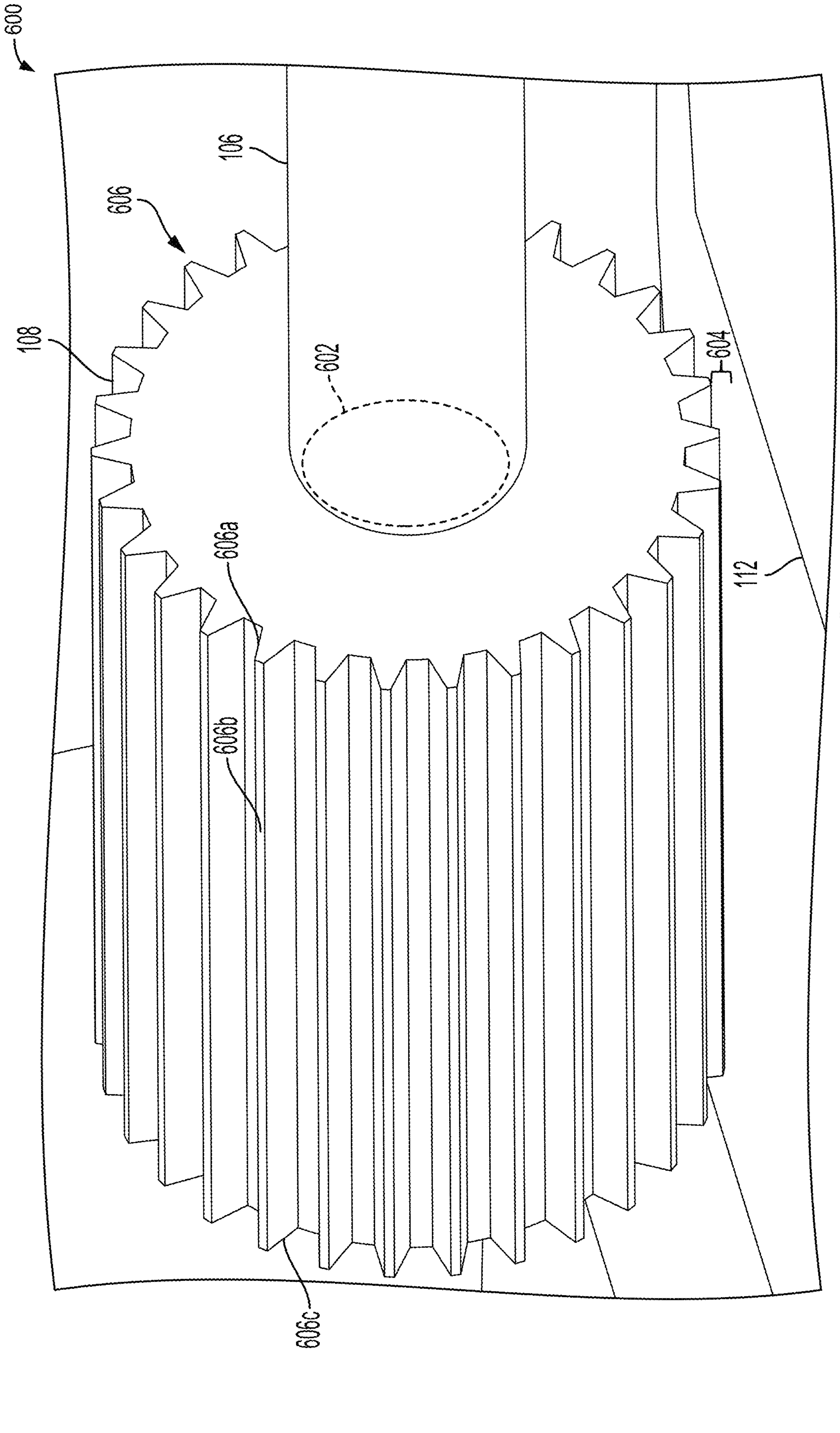
FIG. 6 is a first perspective view of the sensor power supply system depicted in FIG. 1.
Figure 7:
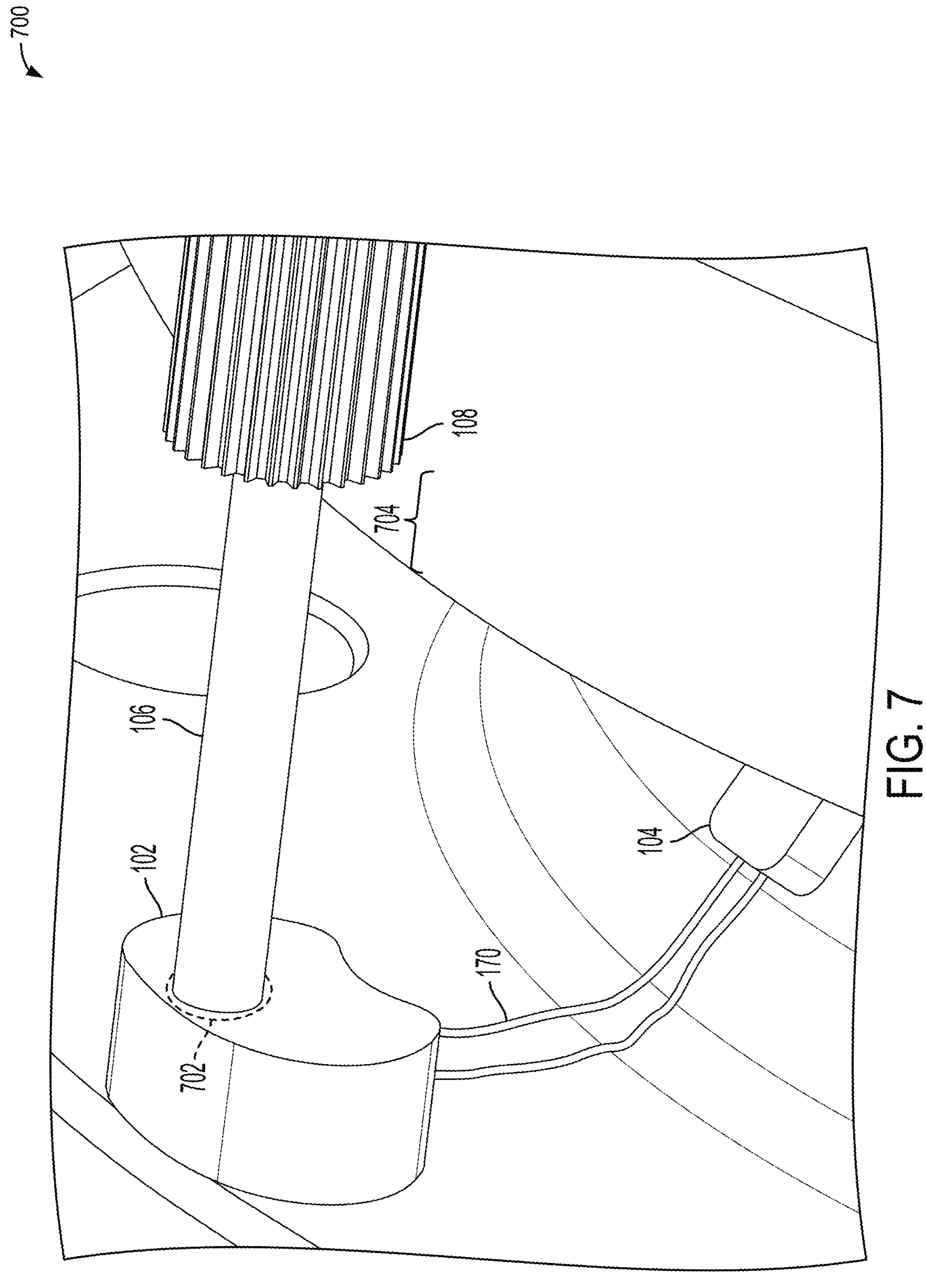
FIG. 7 is a second perspective view of the sensor power supply system depicted in FIG. 1.

FIG. 1 shows an example sensor power supply system comprising at least a dynamo and a sensor. FIG. 2 shows a gearbox assembly of a gearbox that incorporates the sensor power supply system of FIG. 1. An assembled view of a portion of the gearbox assembly wherein the sensor power supply system is integrated is shown in FIG. 3. A cross sectional view of the portion of the gearbox assembly depicted in FIG. 3 is illustrated in FIG. 4. FIG. 5 illustrates a method for powering a sensor using the sensor power supply system. FIG. 6 shows a perspective view of the rotating wheel and the axle. FIG. 7 shows a perspective view of the sensor power supply system.

FIG. 1 depicts a sensor power supply system 100 used to power a sensor positioned between two components wherein a rotational speed difference exists between the two components. The sensor power supply system 100 includes at least a dynamo 101 and a sensor 104 wherein the dynamo is electrically coupled to via two wires 170. Another embodiment of the sensor power supply system 100 may also include a battery or an accumulator (not shown). In such embodiments, the dynamo 101 is electrically coupled to the battery or the accumulator via wires and the battery or the accumulator is electrically coupled to the sensor via wires.

The dynamo 101 includes a case 102 that encloses a rotor that includes a plurality of magnets and a coil, a rotating wheel 108, and an axle 106 that couples the rotating wheel 108 and the case 102. The case 102 is disposed at one end of the axle 106 and the rotating wheel 108 is disposed at an opposite end of the axle. More specifically, the axle 106 may be coupled to both the rotating wheel 108 and the rotor enclosed in the case 102 or rather, the rotating wheel 108 is disposed at one end of the axle 106 and the rotor is disposed at the opposite end of the axle inside the case 102. The case 102 is coupled to a first component 110 at a first mounting location on a surface of the first component 110 and electrically coupled to a sensor 104 positioned at a second mounting location on the surface of the first component 110, the first mounting location being different from the second mounting location. The sensor 104, and thus the second mounting location, is positioned more inboard on the first component 110 to reduce potential noise generation in signals due to vibration of the first component 110. In this way, the sensor 104 and the case 102 may remain in place as the first component 110 rotates. A third mounting location different from both the first mounting location and the second mounting location may position the battery or the accumulator in embodiments wherein the sensor power supply system includes the battery or the accumulator. The rotating wheel 108 touches (e.g., physically contacts with a contact pressure greater than zero newtons) but is not coupled to a second component 112.

Turning to FIG. 6, a perspective view 600 of the rotating wheel 108 in contact with the second component 112 and coupled to the axle 106 is shown. The rotating wheel 108 is configured with a hole 602 wherein an end of the axle 106 extends through and allows the rotating wheel 108 to surround the end of the axle 106. In this way, the rotating wheel 108 is coupled to the axle 106 to ensure rotational movement of the rotating wheel causes the axle to rotate at the same speed as the rotating wheel. The axle 106 may be generally rigid but has sufficient elasticity to enable the rotating wheel 108 to be loaded onto the outer surface of the second component 112 to increase contact pressure between the rotating wheel and the outer surface of the second component. The rotating wheel 108 is positioned above an outer surface of the second component 112 with a vertical clearance 604 that enables the rotating wheel and the second component to be in contact and allows the rotating wheel to rotate about the outer surface of the second component.

The rotating wheel 108 includes a plurality of ridges 606 positioned on an outer surface of the rotating wheel 108 that extend from one end of the rotating wheel to an opposite end of the rotating wheel. Each ridge of the plurality of ridges 606 includes a first angled lateral side 606*a*, a top side 606*b*, and a second angled lateral side 606*c*. The first angled lateral side 606*a* and the second angled lateral side 606*c* are spaced apart by the top side 606*b* and are inclined away from each other, such that a vertical cross section of each ridge is trapezoidal in shape. The plurality of ridges 606 provides a surface to create friction between the rotating wheel 108 and the outer surface of the second component 112, which allows the rotating wheel 108 to rotate.

The first component 110 rotates at a first speed and the second component 112 either rotates at a second speed different than the first speed or does not rotate. The first component 110 and the second component 112 may be various rotating components, including a flange, a gearbox shaft, a wheel hub, a gear, and the like. The two wires 170 are configured to remain in place as the first component 110 rotates in addition to the case 102 and the sensor 104. Due to the sensor 104 rotating with the first component 110, the two wires 170 may be used to transmit the current to the sensor instead of using wireless sensors.

Since the rotating wheel 108 physically touches the second component 112, the rotating wheel 108 may rotate in response to a difference in rotational speed between the first component 110 and the second component 112. In particular, frictional forces created when the plurality of ridges 606 contact the outer surface of the second component 112 when the first component 110, and thus, the rotating wheel 108 coupled to the other dynamo components, begins rotating transmits torque to the rotating wheel, which causes rotation of the rotating wheel. Due to the elasticity of the axle 106, the rotating wheel 108 is able to maintain contact pressure with the second component 212 as the rotating wheel 108 rotates.

Rotation of the rotating wheel 108 may cause the axle 106 to rotate, which in turn causes the rotor and the plurality of magnets enclosed in the case 102 to rotate which generates a magnetic field. The magnetic field induces a current in the coil enclosed in the case 102 which may be supplied to the sensor 104 to power the sensor via two wires 170. The sensor is fixed to the first component 110 so that it rotates exactly with first component 110. In embodiments wherein the dynamo 101 is electrically coupled to a battery and the battery is electrically coupled to the sensor, the current induced by the magnetic field may be supplied to a battery or accumulator coupled to the sensor 104 to charge the battery or the accumulator. In this way, the battery or accumulator may supply electricity to the sensor 104 to power the sensor.

FIG. 7 shows a perspective view 700 of the sensor power supply system 100. The perspective view 700 may include components described above with respect to FIGS. 1 and 6. Some overlapping components may be omitted for brevity. In particular, the coupling of the case 102 the axle 106 is shown. The case 102 is configured with a hole 702 wherein the axle 106 extends through. There is sufficient clearance between the outer surface of the axle 106 and the outer surface of the hole to enable rotation of the axle 106 within the case. The perspective view 700 also shows the rotating wheel 108 being positioned inboard on the first component 110. More specifically, the rotating wheel 108 is positioned inboard on the first component 110 at a threshold distance 704 from an edge of the first component 110.

It may be understood that sensor power supply system described herein is exemplary and may depart from the example provided above without departing from the scope of the present disclosure. As an example, the number of dynamos, the number of sensors, the number of batteries, or the number of accumulators may differ from the example provided above. More specifically, although wired sensors are described herein, wireless sensors may also be used in the sensor power supply system.

By implementing a sensor power supply system with such a configuration, a sensor may be powered with a mechanical system instead of an electrical system. Using a mechanical-based sensor power supply system is advantageous considering that electrical systems that are used to power sensors may generate an electric field that may affect the measurement system of the sensor or the energy transfer system of an electrical-based sensor power supply system. As such, the accuracy of the measurements obtained using a mechanical-based sensor power supply system may be greater, and thus, monitoring of the performance of different vehicle systems may be enhanced, which may allow for increased performance of the vehicle.

FIG. 2 illustrates a gearbox assembly 200 of a vehicle wherein the sensor power supply system described in FIG. 1 may be integrated. The gearbox assembly 200 includes a gearbox housing 202 that encloses various components of the gearbox. The gearbox assembly may include bearings to facilitate rotation of a pinion shaft and one or more gears, a gearbox housing that encloses the bearings, the one or more gears, and the pinion shaft, the pinion shaft being coupled to a flange via a nut, and a sensor power supply system comprising at least a sensor and a dynamo wherein a rotating wheel of the dynamo is disposed on a surface of the flange and a case of the dynamo is in contact with another component.

For example, the gearbox assembly may include a flange 210 and a second component 212, which may be embodiments of the first component 110 and the second component 112 described in FIG. 1. The second component 212 may be a flange, a gearbox shaft, a wheel hub, or a gear. The flange 210 is coupled to a drive shaft that is coupled to a motor of the vehicle. In this way, relevant parameters of the drive shaft may be determined by integrating the sensor power supply system described herein.

Accordingly, a dynamo 101 may be assembled between the flange 210 and the second component 212 as described herein. In particular, the case 102 may be positioned at a first mounting location and the sensor 104 may be positioned at a second mounting location on the flange 210, the first mounting location being different than the first mounting location. To assemble the case 102 and the sensor 104, a surface of the flange 210 may be machined to form the first mounting location and the second mounting location. In some embodiments wherein the sensor power supply system includes a battery or an accumulator, the battery or accumulator may be positioned at a third mounting location on the flange 210, the third mounting location being different than the first mounting location and the second mounting location. To assemble the battery or case, the surface of the flange 210 may be machined to form the third mounting location. The sensor 104 may measure different parameters in different embodiments. In one example, the sensor 104 may be a strain gauge to measure strain. In another example, the sensor 104 may be an acceleration sensor or a position sensor.

Similar to above, the flange 210 may rotate at a first speed and the second component 212 may rotate at a second speed different than the first speed or may be non-rotating. The rotational speed difference between the flange 210 and the second component 212 may enable the dynamo to convert mechanical energy to electrical energy which may be used to power the sensor 104 or charge a battery or accumulator coupled to the dynamo 101 and the sensor 104 according to the method described in FIG. 5.

FIG. 3 shows an assembled view 300 of portion of a gearbox assembly configured with the sensor power supply system described herein with respect to FIG. 1. The gearbox assembly may be included in a gearbox of an electric axle or other suitable system. The gearbox assembly is an example of the gearbox assembly 200 shown in FIG. 2. Therefore, the components of the gearbox assembly may be included in the gearbox assembly 200 shown in FIG. 2 and vice versa. In particular, the sensor power supply system 100 is disposed on the flange 210 to convert mechanical energy to electrical energy to power the sensor of the sensor power supply system.

In the illustrated example, the assembled view 300 includes a pinion shaft (not shown) with a pinion gear 302 and a first bearing 304 coupled thereto with an outer race 306 (e.g., bearing cup), a spacer 308, a second bearing 312 with an outer race 310 (e.g., bearing cup), a gear 314, a third bearing 318 with an outer race 316, and the flange 210. The width of the spacer 308 may vary with the component's tolerance stack up needed to set the bearing preload. The pinion gear 302, the first bearing, the spacer 308, the second bearing 312, the third bearing 318, and the flange are coupled to the pinion shaft (not shown). The first bearing 304, the second bearing 312, and the third bearing 318 facilitate rotation of the pinion shaft.

The first bearing 304 is positioned between the pinion gear 302 and the spacer 308 on the pinion shaft. The spacer 308 is positioned between the first bearing 304 and the second bearing 312 on the pinion shaft. The second bearing 312 is positioned between the spacer 308 and the gear 314 on the pinion shaft. The gear 314 is positioned the second bearing 312 and the third bearing 318 on the pinion shaft. The third bearing 318 is positioned between the gear 314 and the flange 210 on the pinion shaft.

It may be understood that the portion of the gearbox assembly described herein is exemplary and may depart from the example provided above without departing from the scope of the present disclosure. As an example, the number of gears, type of gears, number of bearings, and type of bearings may differ from the example provided above.

FIG. 4 shows a cross section 400 of a portion of the gearbox assembly which may be included in an electric axle or other suitable system. The portion of the gearbox assembly is an example of the gearbox assembly shown in FIG. 3 assembled in the gearbox housing 202 depicted in FIG. 2. Therefore, the components of the gearbox assembly may be included in the gearbox assembly shown in FIG. 3 and vice versa. In particular, the sensor power supply system 100 is disposed on the flange 210 to convert mechanical energy to electrical energy to power the sensor of the sensor power supply system. Further the cross section 400 includes the bearings, such as the first bearing 304, the second bearing 312, and the third bearing 318, the spacer 308, the pinion gear 302, and the gear 314.

The pinion gear 302 on the pinion shaft 402 may be integral, press-fit, splined, and/or welded to the pinion shaft, for example. The cross section 400 further includes a first inner racer 404 coupled to a pinion shaft 402, surrounded by the first bearing 304, and positioned between the pinion gear 302 and the spacer 308. The cross section 400 also includes a second inner racer 406 coupled to the pinion shaft 402, surrounded by the second bearing 312, and positioned between the spacer 308 and the gear 314. The cross section 400 also includes a nut 408 profiled to thread onto a threaded end of the pinion shaft 402 when installed.

Although not depicted, the gearbox assembly also includes a lubrication system that lubricates components of the cross section 400. However, the sensor power supply system, including the dynamo 101 and the respective components of the dynamo, the sensor, and optionally a battery or accumulator, are external to the lubrication system and thus, lubrication fluid of the lubrication system is not expected to affect the operation of the sensor power supply system.

FIG. 5 shows an example method 500 for operation of a sensor power supply system, such as the sensor power supply system 100 described above in reference to FIG. 1, in one example. Method 500 may be carried out by a controller, and stored as instructions in memory therein. Instructions for carrying out method 500 may be executed by the controller in conjunction with signals received from sensors of the vehicle.

At 502, the method includes generating electrical energy via a sensor power supply system in response to achieving a rotational speed difference between a first component and a second component. As described herein, the case of the dynamo may be positioned at a first mounting location on a surface of the first component, which may be a flange, and the sensor may be positioned at a second mounting location of the surface of the first component. In addition, a rotating wheel of the dynamo may be in contact with a second component. Achieving the rotational speed difference between the first component and the second component comprises transmitting torque to a rolling wheel of the dynamo by rotating a first component wherein the dynamo is disposed on via transmission of torque generated by a motor.

In other words, transmission of torque from the motor causes the shaft wherein the first component is coupled thereto to rotate, which in turn, causes the first component to rotate. Considering that the rolling wheel of the dynamo is not coupled to the second component but is in contact with the second component, the rotating wheel rotates around the second component while maintaining contact with the second component as the first component rotates. Since the first component and the second component rotate at different speeds, friction due to the rotational speed difference between the first component and the second component causes the rotating wheel to rotate due to torque being transmitted to the rotating wheel (e.g. due to friction created between the plurality of ridges of the rotating wheel and the outer surface of the second component). As described herein with respect to FIG. 1, since the axle is coupled to the rotating wheel, rotation of the rotating wheel results in rotation of the axle and the rotor coupled thereto. Rotation of the rotor and the plurality of magnets generates a magnetic field which induces a current (or electrical energy) in a coil of the dynamo.

For example, in reference to FIGS. 2 and 3, the case of the dynamo is disposed at a first mounting location on the surface of the flange of the gearbox assembly, the flange being coupled to the drive shaft of the motor and the sensor of the dynamo is disposed at a second mounting location on the surface of the flange. Transmission of torque from the motor causes the pinion shaft wherein the flange is coupled thereto to rotate and thus, the flange to rotate. Similarly, the rotating wheel of the dynamo in contact with a second component of the gearbox assembly and rotates around the second component while maintaining contact with the second component as the flange rotates. Considering that the flange and the second component have different rotational speeds, friction between the rotating wheel and the second component due to the rotational speed difference between the flange and the second component (e.g., due to friction created between the plurality of ridges of the rotating wheel and the second component) cause the rotating wheel to rotate and generate mechanical energy that is transformed to electrical energy by the other working components of the dynamo (e.g., the axle, the rotor, and the coil).

At 504, the method includes supplying the generated electrical energy to the sensor to power the sensor. Sensor power supply systems that include at least the sensor and the dynamo may supply electrical energy to the sensor to power the sensor by directly supplying the generated electrical energy from the dynamo to the sensor via wires coupling the sensor and the dynamo. In this way, the electrical energy used to operate the sensor and measure the parameter of interest may be generated and used in real time or near real time.

In contrast, the power supply control scheme for sensor power supply systems that incorporate batteries or accumulators in addition to the dynamo and sensor may differ. In particular, sensor power supply systems that also comprise a battery may supply electrical energy to the sensor to power the sensor by charging the battery using the generated electrical energy from the dynamo via wires that electrically couple the dynamo and the battery and supplying the generated electrical energy from the battery to the sensor via wires that electrically couple the sensor and the battery. Similarly, sensor power supply systems also comprising an accumulator may supply electrical energy to the sensor to power the sensor by charging the accumulator using the generated electrical energy from the dynamo via wires that electrically couple the dynamo and the accumulator and supplying the generated electrical energy from the battery to the sensor via wires that electrically couple the sensor and the accumulator.

Accordingly, the electrical energy used to operate the sensor and measure the parameter may be replenished and stored in the battery or accumulator. Different control schemes for transferring the generated electrical energy from the dynamo to the battery may be implemented. As an example, the battery may be supplied with the generated electrical energy from the dynamo in real time or near-real time. In another example, the battery may be supplied with the generated electrical energy from the dynamo when the state of charge (SOC) of the battery is within a threshold value. The method 500 then ends.

The technical effect of implementing a mechanical-based sensor power supply system comprising at least a dynamo and a sensor disposed between a first component that is in rotation and a second component that is either fixed or in rotation is that the mechanical-based sensor power supply system does not generate an electric field that affects measurements of the system, which may lead to more accurate measurement and increased vehicle performance due to more accurate monitoring of various vehicle systems.

The disclosure also provides support for a sensor power supply system, comprising: a dynamo comprising a case that encloses a plurality of magnets, a coil, and rotor, a rotating wheel comprising a plurality of ridges positioned on an outer surface of the rotating wheel, and an axle that couples the case and the rotating wheel, and wherein the dynamo is coupled to a first component and a sensor and the rotating wheel touches a second component. In a first example of the system, the first component rotates at a first speed. In a second example of the system, optionally including the first example, the second component rotates at a second speed different than the first speed or does not rotate. In a third example of the system, optionally including one or both of the first and second examples, the sensor is electrically coupled to the dynamo via wires. In a fourth example of the system, optionally including one or more or each of the first through third examples, the dynamo is alternatively electrically coupled to a battery via wires and the battery is electrically coupled to the sensor via wires. In a fifth example of the system, optionally including one or more or each of the first through fourth examples, the dynamo is alternatively electrically coupled to an accumulator via wires and the accumulator is electrically coupled to the sensor via wires. In a sixth example of the system, optionally including one or more or each of the first through fifth examples, the first component or the second component is a flange, a gearbox shaft, a wheel hub, or a gear.

The disclosure also provides support for a method for charging a sensor, comprising: generating electrical energy via a sensor power supply system comprising at least a sensor, and a dynamo in response to achieving a rotational speed difference between a first component and a second component, and supplying the generated electrical energy to the sensor to power the sensor. In a first example of the method, achieving the rotational speed difference between the first component and the second component comprises transmitting torque to a rolling wheel of the dynamo that touches the second component by rotating the first component wherein the dynamo is disposed on via transmission of torque generated by a motor. In a second example of the method, optionally including the first example, for sensor power supply systems comprising at least the sensor and the dynamo, supplying electrical energy to the sensor to power the sensor comprises directly supplying the generated electrical energy from the dynamo to the sensor via wires coupling the sensor and the dynamo. In a third example of the method, optionally including one or both of the first and second examples, for sensor power supply systems also comprising a battery, supplying electrical energy to the sensor to power the sensor comprises: charging the battery using the generated electrical energy from the dynamo via wires electrically coupling the dynamo and the battery, and supplying the generated electrical energy from the battery to the sensor via wires electrically coupling the sensor and the battery. In a fourth example of the method, optionally including one or more or each of the first through third examples, for sensor power supply systems also comprising an accumulator, supplying electrical energy to the sensor to power the sensor comprises: charging the accumulator using the generated electrical energy from the dynamo via wires electrically coupling the dynamo and the accumulator, and supplying the generated electrical energy from the accumulator to the sensor via wires electrically coupling the sensor and the accumulator.

The disclosure also provides support for a gearbox, comprising: a gearbox assembly comprising bearings to facilitate rotation of a pinion shaft and one or more gears, a gearbox housing that encloses the bearings, the one or more gears, and the pinion shaft, the pinion shaft being coupled to a flange via a nut, and a sensor power supply system comprising at least a sensor and a dynamo wherein a rotating wheel of the dynamo is disposed on a surface of the flange and a case of the dynamo is in contact with another component. In a first example of the system, a first mounting location is machined onto the surface of the flange to position the case. In a second example of the system, optionally including the first example, a second mounting location is machined onto the surface of the flange to position the rotating wheel. In a third example of the system, optionally including one or both of the first and second examples, a third mounting location is machined onto the surface of the flange to position a battery. In a fourth example of the system, optionally including one or more or each of the first through third examples, the third mounting location positions an accumulator instead of the battery. In a fifth example of the system, optionally including one or more or each of the first through fourth examples, the first mounting location is different than the second mounting location and third mounting location is different than the first mounting location and the second mounting location. In a sixth example of the system, optionally including one or more or each of the first through fifth examples, the sensor is a strain gauge, an acceleration sensor, or a position sensor. In a seventh example of the system, optionally including one or more or each of the first through sixth examples, the sensor power supply system is positioned external to a lubrication system of the gearbox.

FIGS. 1-4, 6, and 7 are drawn approximately to scale, aside from the schematically depicted components. However, the sensor power supply system and gearbox assembly may have other relative components dimensions in alternate embodiments.

FIGS. 1-4, 6, and 7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The manufacturing methods and routines disclosed herein may be stored as executable instructions in non-transitory memory and may be carried out by a manufacturing system including the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, HEVs, BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. A sensor power supply system, comprising:

a dynamo comprising a case that encloses a plurality of magnets, a coil, and rotor, a rotating wheel comprising a plurality of ridges positioned on an outer surface of the rotating wheel, and an axle that couples the case and the rotating wheel; and wherein the dynamo is coupled to a first component at a first mounting location on a surface of the first component and electrically coupled to a sensor positioned at a second mounting location on the surface of the first component, the first mounting location being different from the second mounting location, and the rotating wheel touches a second component such that a rotational speed difference between the first component and the second component causes the rotating wheel to rotate and generate electrical energy.

2. The sensor power supply system of claim 1, wherein the first component rotates at a first speed.

3. The sensor power supply system of claim 2, wherein the second component rotates at a second speed different than the first speed or does not rotate.

4. The sensor power supply system of claim 1, wherein the sensor is electrically coupled to the dynamo via wires.

5. The sensor power supply system of claim 4, wherein the dynamo is alternatively electrically coupled to a battery via wires and the battery is electrically coupled to the sensor via wires.

6. The sensor power supply system of claim 4, wherein the dynamo is alternatively electrically coupled to an accumulator via wires and the accumulator is electrically coupled to the sensor via wires.

7. The sensor power supply system of claim 1, wherein the first component or the second component is a flange, a gearbox shaft, a wheel hub, or a gear.

8. A method for charging a sensor, comprising:

generating electrical energy via a sensor power supply system comprising at least a sensor, and a dynamo in response to achieving a rotational speed difference between a first component and a second component, wherein a case of the dynamo is positioned at a first mounting location on a surface of the first component and the sensor is positioned at a second mounting location on the surface of the first component, the first mounting location being different from the second mounting location, and wherein a rotating wheel of the dynamo physically contacts the second component such that the rotational speed difference causes the rotating wheel to rotate relative to the case and generate the electrical energy; and supplying the generated electrical energy to the sensor to power the sensor.

9. The method of claim 8, wherein achieving the rotational speed difference between the first component and the second component comprises transmitting torque to a rolling wheel of the dynamo that touches the second component by rotating the first component wherein the dynamo is disposed on via transmission of torque generated by a motor.

10. The method of claim 8, wherein for sensor power supply systems comprising at least the sensor and the dynamo, supplying electrical energy to the sensor to power the sensor comprises directly supplying the generated electrical energy from the dynamo to the sensor via wires coupling the sensor and the dynamo.

11. The method of claim 8, wherein for sensor power supply systems also comprising a battery, supplying electrical energy to the sensor to power the sensor comprises:

charging the battery using the generated electrical energy from the dynamo via wires electrically coupling the dynamo and the battery; and supplying the generated electrical energy from the battery to the sensor via wires electrically coupling the sensor and the battery.

12. The method of claim 8, wherein for sensor power supply systems also comprising an accumulator, supplying electrical energy to the sensor to power the sensor comprises:

charging the accumulator using the generated electrical energy from the dynamo via wires electrically coupling the dynamo and the accumulator; and supplying the generated electrical energy from the accumulator to the sensor via wires electrically coupling the sensor and the accumulator.

13. A gearbox, comprising:

a gearbox assembly comprising bearings to facilitate rotation of a pinion shaft and one or more gears;

a gearbox housing that encloses the bearings, the one or more gears, and the pinion shaft, the pinion shaft being coupled to a flange via a nut; and a sensor power supply system comprising at least a sensor and a dynamo wherein a rotating wheel of the dynamo is disposed on a surface of the flange at a first machined mounting location on the surface of the flange and a case of the dynamo is positioned at a second machined mounting location on the surface of the flange, the second machined mounting location being different from the first machined mounting location, and the case is in contact with another component such that a rotational speed difference between the flange and the another component causes the rotating wheel to rotate and generate electrical energy supplied to the sensor.

14. The gearbox of claim 13, wherein the second machined mounting location is machined onto the surface of the flange to position the case and the first machined mounting location is machined onto the surface of the flange to position the rotating wheel.

15. The gearbox of claim 14, wherein a third mounting location is machined onto the surface of the flange to position a battery or an accumulator.

16. The gearbox of claim 15, wherein the third mounting location is machined onto the surface of the flange to position the battery.

17. The gearbox of claim 15, wherein the third mounting location positions the accumulator instead of the battery.

18. The gearbox of claim 15, wherein the first mounting location is different than the second mounting location and third mounting location is different than the first mounting location and the second mounting location.

19. The gearbox of claim 13, wherein the sensor is a strain gauge, an acceleration sensor, or a position sensor.

20. The gearbox of claim 13, wherein the sensor power supply system is positioned external to a lubrication system of the gearbox.

* * * * *